United States Patent
Cannon et al.

(10) Patent No.: US 7,904,425 B2
(45) Date of Patent: Mar. 8, 2011

(54) GENERATING BACKUP SETS TO A SPECIFIC POINT IN TIME

(75) Inventors: David Maxwell Cannon, Tucson, AZ (US); Kenneth Eugene Hannigan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/301,624

(22) Filed: Dec. 13, 2005

(65) Prior Publication Data

US 2007/0136381 A1 Jun. 14, 2007

(51) Int. Cl.
*G06F 7/00* (2006.01)
*G06F 17/00* (2006.01)

(52) U.S. Cl. .................................... 707/654; 707/662
(58) Field of Classification Search .................. None
See application file for complete search history.

(56) References Cited

U.S. PATENT DOCUMENTS

| | | | |
|---|---|---|---|
| 4,823,261 A * | 4/1989 | Bank et al. ................... 711/152 |
| 5,347,653 A * | 9/1994 | Flynn et al. ................... 707/695 |
| 5,778,395 A * | 7/1998 | Whiting et al. ................... 1/1 |
| 5,924,102 A * | 7/1999 | Perks ................................ 1/1 |
| 6,023,710 A * | 2/2000 | Steiner et al. ................. 707/204 |
| 6,055,227 A * | 4/2000 | Lennert et al. ................. 370/254 |
| 6,212,531 B1 | 4/2001 | Blea et al. |
| 6,434,681 B1 * | 8/2002 | Armangau ..................... 711/162 |
| 6,449,003 B1 * | 9/2002 | Mayer et al. .................... 348/43 |
| 6,460,055 B1 * | 10/2002 | Midgley et al. ................ 707/204 |
| 6,647,399 B2 | 11/2003 | Zaremba |
| 6,880,053 B2 | 4/2005 | Kiselev et al. |
| 6,973,553 B1 * | 12/2005 | Archibald et al. ............. 711/162 |
| 7,155,465 B2 * | 12/2006 | Lee et al. ............................... 1/1 |
| 2002/0112134 A1 * | 8/2002 | Ohran et al. ................... 711/162 |
| 2003/0158831 A1 * | 8/2003 | Zaremba ............................ 707/1 |

(Continued)

FOREIGN PATENT DOCUMENTS

CN 1483164 A 3/2004

(Continued)

OTHER PUBLICATIONS

Robocopy.exe, Robust File Copy Utility, Version XP010, Publisher Microsoft Corporation, Apr. 24, 2003.*

(Continued)

*Primary Examiner* — Charles Rones
*Assistant Examiner* — Daniel Kuddus
(74) *Attorney, Agent, or Firm* — Francis Lammes; Stephen J. Walder, Jr.; Feb R. Cabrasawan (57) ABSTRACT

Generating backup sets for a specific point in time from backup data stored in a backup storage device is provided. A backup set, in accordance with an illustrative embodiment, is a collection of the files and data that would have been the most recently backed-up version of a computer's files and data at the particular point in time if the backup set had been created at that point in time. In order to generate the backup set, versions of data objects are identified in the backup storage system that have backup timestamps equal to or prior to the designated point in time and that have deactivation times that are after the designated point in time. In addition, a mechanism for deleting versions of data objects based on a retention time and an inactive version limit is provided.

10 Claims, 5 Drawing Sheets

U.S. PATENT DOCUMENTS

2003/0225800 A1 12/2003 Kavuri
2005/0169064 A1 8/2005 Kiselev et al.

FOREIGN PATENT DOCUMENTS

WO     WO 00/07104     2/2000

OTHER PUBLICATIONS

Kaczmarski et al., "Beyond backup toward storage management", IBM Systems Journal, vol. 42, No. 2, 2003, pp. 322-337.
Communication pursuant to Article 94(3) EPC dated Nov. 18, 2010, Application No. 06 830 225.6-2224, 4 pages.

\* cited by examiner

GENERATING BACKUP SETS TO A SPECIFIC POINT IN TIME

BACKGROUND

1. Technical Field

The present application relates generally to an improved data processing system and method. More specifically, the present application is directed to a system and method for generating backup sets to a specific point in time.

2. Description of Related Art

The Internet provides an infrastructure for the widespread public availability of large volumes of information. With the increased availability of information, it is increasingly important for users to have some means for storing and conveniently managing their data. In this respect, the development of electronic data storage systems is more important today than ever before.

Various flexible systems, referred to as "storage management servers," have been developed for storing and managing data for remotely located clients. One particular system, available from International Business Machines, Inc. (IBM), is the Tivoli Storage Manager™ (TSM), previously named Adstar Distributed Storage Manager™ (ADSM). With TSM, a central server is coupled to multiple client platforms and one or more administrators. The server provides storage, backup, retrieval, and other management functions for the server's clients.

With TSM, backup-archive clients can back up and restore files and directories at the server. The TSM database tracks information about stored files such as their attributes and storage location, and also maintains information about clients, administrators, policies, and schedules. The backup-archive client can copy files, subdirectories, and directories to media controlled by the server. Backups can be controlled by administrator-defined policies and schedules, or users can request backups of their own data. The backup policy in the backup copy group indicates how many backup versions the server keeps of files and directories, and how long the server keeps backup versions of files and directories before expiring the previous versions of the backup. The most recent backup version of a file, corresponding to the file still stored on the client system, is referred to as the active version and is not eligible for expiration. Only inactive backup versions can be expired.

Prior art versions of TSM include a backup/archive client program for backing up files and a client program for backing-up database objects. Back-ups at the file level involve inserting a new version of the entire file including changes since the prior backup. File-level backup is based on an "incremental forever" methodology whereby once a file has been backed up, that file never needs to be backed up again unless it changes on the client machine. Database application clients that interface with database products may use TSM commands to perform incremental backups of the database object that include only the changed data since the last full backup, not the entire database object. This allows the database application client to only send that part of the database object that has changed in the incremental backup to the backup server instead of having to send the entire database object, which can be substantially large. The schedule of performing incremental backups is defined in the TSM server database.

"Backup sets" are copies of the most recently backed-up versions of a computer's files, put together into an aggregate data structure stored on a set of removable media, such as magnetic tape, optical disk, or the like. For example, using the incremental forever backups of TSM, a backup set would be the most recently backed-up version of a client computer's files as determined by the TSM database.

Backup sets fill a number of different storage management needs. For example, they are frequently used as long term archival copies of critical business data and off-site copies of backup data used for disaster recovery. In addition, backup sets are used as portable backup copies that can be restored directly on the local computer, without the need for a remote storage management server.

Despite the usefulness of backup sets, there are times when the most recently backed-up version of a computer's files are not what is needed by a user. There are times when yesterday's backup versions, last week's backup version, or even last month's backup version is needed instead of the most recently backed-up version of a computer's files. If the system administrator has the foresight to create a backup set at those specific times, then the need is already fulfilled, however it is not always possible to anticipate every need with regard to backing up computer files. Moreover, even if the need is anticipated, operational difficulties may sometimes delay the operation until it is too late to create a backup set with the desired content.

In addition to the above difficulties, "the most recently backed-up versions of a computer's files" may be a moving target. That is, if the computer's files are being backed-up at the same time as a backup set for that computer is being created, then there is a chance that the backup set will contain an inconsistent snapshot of the computer's files, i.e. it will contain versions of some of the computer's files that are active and versions of other ones of the computer file's that are inactive because the backup operation adds new versions of those files after the backup set is created. In other words, depending on when particular files are copied into the backup set, the backup set may contain some files that were backed-up on one day, and other files that were backed-up on another day.

SUMMARY

The illustrative embodiment provides a mechanism for generating backup sets for a specific point in time from backup data stored in a backup storage device. The mechanism of the illustrative embodiment extends the backup set concept from being a copy of the most recently backed-up version of a computer's files or data to being a copy of a computer's files or data for which there were active backups at a particular point in time. In other words, a backup set, in accordance with the illustrative embodiment, becomes a collection of the files and data that would have been the most recently backed-up version of a computer's files and data at the particular point in time if the backup set had been created at that point in time.

The mechanism of the illustrative embodiment receives a backup set generation request from, for example, a client computing device that is associated with a backup server. Alternatively, an administrator computing device may request backup sets for a plurality of client computing devices associated with the administrator computing device, e.g., an administrator of a business' network may request backup sets for all of the workstations connected to that business' network.

The backup set generation request includes a designation of a particular point in time for which the backup set is to be generated. This particular point in time may be a current time, in which case the backup set would be generated using the most recent version of the backup files and data for the client computing device(s). The particular point in time may also be a time in the past, such as the day before the current time, the week before the current time, the month before the current time, or the like. Regardless of whether the current time or a time in the past is designated, the mechanism of the illustrative embodiment operates to determine what versions of files and data were the most recently backed-up version of the files and data at the particular point in time designated in the backup set generation request.

Creating a backup set with the most recently backed-up versions of a computer's files and data at a particular point in time requires that the mechanism of the illustrative embodiment know when a particular backup version of a file/data, hereafter referred to as a data object, was backed-up and when a particular backup version of a data object was replaced by a newer version or was deactivated because the data object is no longer stored on the client computer. In addition, an operational requirement is that the backup storage maintain all backup versions of all data objects for as long as might be necessary for inclusion in a backup set.

Knowing when a data object was backed-up is one part of the methodology for selecting the backup versions of data objects to be included in a backup set. This leads to a first backup set generation rule that states that, for a given point in time, any data object backed-up after the specified point in time is too new to be considered for inclusion in the backup set. In other words, only data objects backed-up on, or prior to, the specified point in time may be included in the backup set. By applying this rule to the backup versions, a first set of candidate versions of data objects for inclusion in a backup set may be identified.

A backup time of a version of a data object may be used as a sole indicator for deciding whether it should be placed in a backup set or not. However, the backup time alone is not the best indicator of whether or not the version of the data object should be included in the backup set because it requires that the storage management system compare the backup times of every version of the data object to determine which one is the most recent time that is less than or equal to the specified point in time. Such comparisons take increasingly more time as the number of versions increases. Furthermore, this approach may produce incorrect results if the most recent version backed-up prior to the specified point in time has been deleted from the storage management server. In such a case, an even earlier version could incorrectly be added to the backup set. Yet another shortcoming of using only the backup time is that this could allow versions to be included in the backup set that were deleted on the client computer prior to the specified point in time.

Thus, with the mechanism of the illustrative embodiment, a second consideration when determining what versions of data objects to include in a backup set for a specified point in time determines when the backup version was deactivated. Knowing when a backup version of a data object was replaced by a newer version allows the mechanism of the illustrative embodiment to make the decision to include a given version of a data object in the backup set without knowing anything about any other versions.

If the most recently backed-up version is referred to as the "active" version, and all previous versions are referred to as "inactive" versions, then the time at which an active version is replaced by a newer version becomes the time of its deactivation, or its "deactivation time." Similarly, if an active data object is no longer stored on the client machine, the active data object is deactivated during the next backup and the deactivation time is recorded. Data objects that have not yet been deactivated are considered to have a deactivation time infinitely far in the future. Using the deactivation time, a second backup set generation rule states that for a given point in time, any data object that was deactivated on or before the specified point in time is too old to be considered. In other words, only active data objects or inactive data objects deactivated after the specified point in time may be included in the backup set.

By applying this second backup set generation rule to the first set of candidate versions of data objects, the particular versions of the data objects that were the most recently backed-up versions of the data objects at the specified point in time may be identified. The identified versions of the data objects may then be aggregated into a backup set for the specified point in time and provided to the requestor of the backup set. Typically, the backup set will be stored on one or more removable media that are shipped to the requestor.

In an alternative illustrative embodiment of the present invention, rather than having two separate and distinct steps for generating a first candidate set and a second candidate set of versions of data objects for inclusion in a backup set, a single step may be utilized to identify which versions of data objects are to be included in the backup set. That is, information for each data object may be checked to determine whether the object was backed up on or before the specified point in time and whether the deactivation time is greater than the specified point in time, in a single step. If both of these conditions are satisfied, then the data object can be included in the backup set. This process may be repeated in a loop for each object.

This alternative illustrative embodiment may be more efficient in some implementations in that processor cycles and storage space may be saved. Of course either implementation, or even modifications of these implementations, may be used without departing from the spirit and scope of the present invention.

By applying the point in time concept to backup sets, a system administrator is provided with the ability to create a backup set for any particular point in time up to a time limit corresponding to an oldest inactive backup. Thus, the system administrator may wait until tomorrow to create yesterday's backup set. As a result, the system administrator is given the ability to respond to new, unanticipated demands for backup data after the window for satisfying the demands would have otherwise closed and the peace of mind of knowing that an operational problem, such as a tape drive failure, no longer means that the month-end backup set on which his or her business' survival depends cannot be created.

In addition, creating a backup set to a particular point in time also resolves inconsistency problems. By only copying data objects that were active at a particular point in time, it no longer matters if one backup version has been replaced by a newer one. The correct version of the backup will be copied into the backup set, regardless of the number of times it has been replaced with newer backup versions. If data objects no longer existed on the client machine at the specified point in time, these will not be copied to the backup set. Generation of a backup set thus becomes an atomic operation that correctly and consistently reflects backup data that existed at the specified point in time.

In addition to the above, in order to permit the generation of backup sets for points in time in the past, all backup versions for data objects for a time period at which an oldest backup set is expected to be requested, are maintained in the backup storage system. There are practical trade-offs involved in storing multiple backup versions for data objects. As more versions of data objects are permitted to be stored in the backup storage system, the backup storage system will require more storage space just for backup purposes. Keeping an unlimited number of versions of data objects is generally not feasible. One must choose between the amount of time one must be able to go back to when generating backup sets, and the amount of storage space available to hold backup versions of data objects.

The mechanism of the illustrative embodiment provides tunable parameters that a user may set for designating the tradeoff between storage space and backup set time period. In the illustrative embodiment, a user may set a retention time parameter and a number of versions parameter. The retention time parameter specifies how long to retain versions of data objects after deactivation. The number of versions specifies the maximum number of backup versions of each data object to retain in the backup storage system.

In the illustrative embodiment, a backup version expiration management engine may be provided that periodically scans information about the backup versions of data objects maintained in the backup storage system to determine whether to delete or maintain the versions of data objects in the backup storage system. The backup version expiration management engine applies two rules to the versions of data objects maintained in the backup storage system. First, any inactive versions of data objects having a backup timestamp that is older than the retention time parameter may be deleted from the backup storage system. Second, if the number of versions of a data object exceeds the number of backup versions parameter, then the oldest backup versions of the data object may be deleted until the number of versions of a data object is less than or equal to this limit parameter. In this way, the amount of storage space utilized for backup versions may be kept to a minimum for a particular sliding window during which point-in-time backup sets may be generated using the mechanism of the illustrative embodiment.

In one illustrative embodiment, a computer program product comprising a computer usable medium having a computer readable program is provided. The computer readable program, when executed on a computing device, causes the computing device to receive a request for generation of a backup set. The request may include a point in time for which the backup set is to be generated that is prior to a current time. The computer readable program may further cause the computing device to identify versions of data objects in a backup storage system that would have been the most recently backed-up version of the data objects at the point in time if the backup set had been created at that point in time and store the identified versions of data objects as the backup set for the point in time. The data object may be an electronic file, for example.

The computer readable program may cause the computing device to identify versions of data objects in a backup storage system by identifying versions of data objects in the backup storage system that are the most recent versions of the data objects at the point in time and that have deactivation times after the point in time. The computer readable program may further cause the computing device to identify versions of data objects in a backup storage system by identifying a first candidate set of versions of data objects in a backup storage system that have backup timestamps equal to or prior to the point in time and identifying a second candidate set of versions of data objects in the first candidate set that have deactivation times after the point in time.

The computer readable program may cause the computing device to identify a first candidate set of versions of data objects by retrieving backup catalog information for the versions of data objects, searching entries in the backup catalog information to identify entries having a backup timestamp that is equal to or prior to the point in time, and storing entries having a backup timestamp that is equal to or prior to the point in time in the first candidate set. The computer readable program may cause the computing device to identify a second candidate set of versions of data objects in the first candidate set by searching the entries in the first candidate set to identify entries having a deactivation time that is after the point in time and storing entries having a deactivation time that is after the point in time in the second candidate set.

The computer readable program may further cause the computing device to search the versions of the data objects to identify data objects having a backup timestamp that is older than a retention time parameter. A determination may be made for each version of a data object, in the versions of the data objects, having a backup timestamp older than the retention time parameter, whether the version is an active version of the data object. Moreover, a version of the data object may be deleted if the version of the data object is not an active version of the data object.

The computer readable program may further cause the computing device to search the versions of the data objects to identify data objects for which a number of versions maintained in the backup storage system is greater than a version limit. Oldest versions of the versions of data objects that have a number of versions maintained in the backup storage system that is greater than the version limit may be deleted.

The request for generation of a backup set may include at least one parameter designating a type of data object to include in the backup set. The computer readable program may further cause the computing device to identify versions of data objects in a backup storage system by filtering data objects to be included in the backup set based on the at least one parameter. The at least one parameter designating the type of data object to include in the backup set may designate at least one of an identifier of one or more client computing devices for which the backup set is to be generated, an identifier of one or more server computing devices for which the backup set is to be generated, or an identifier of one or more directories and sub-directories to include in the backup set.

The computer readable program may cause the computing device to identify versions of data objects in a backup storage system in a single operation that is executed on each data object in the backup storage system meeting criteria set forth in the request for generation of a backup set.

In another illustrative embodiment, a system is provided that comprises a processor and a memory coupled to the processor. The memory may comprise instructions which, when executed by the processor, cause the processor to perform the various operations previously discussed above. In yet another illustrative embodiment, a method, in a data processing system is provided for generating a backup set. The method may comprise operations similar to those described above that are performed based on the computer readable program on the computer useable medium.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The illustrative embodiments set forth herein provide mechanisms for generating backup sets from backed-up files and data. The mechanisms of the illustrative embodiments may be implemented entirely in a single computing device or in a distributed data processing environment. In the preferred embodiments, the mechanisms of the illustrative embodiments will be described in terms of a distributed data processing environment in which there are a network of data processing systems provided that may communicate with one another via one or more networks and communication links.

Figure 1:
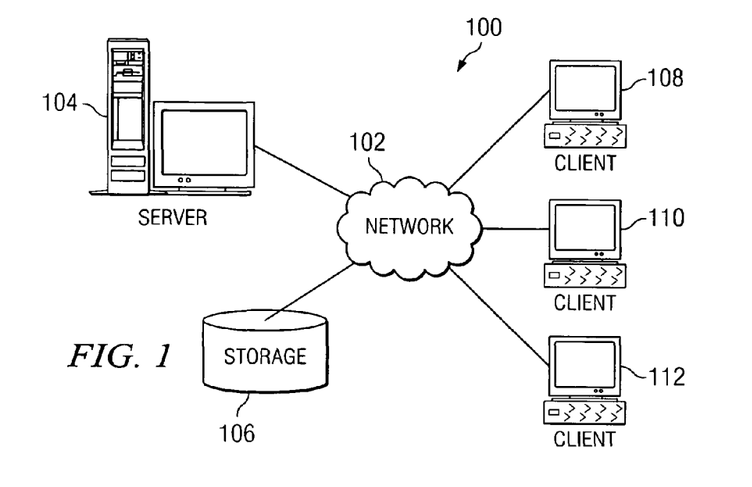
FIG. 1 is an exemplary block diagram of a distributed data processing system in which exemplary aspects of an illustrative embodiment may be implemented.
Figure 2:
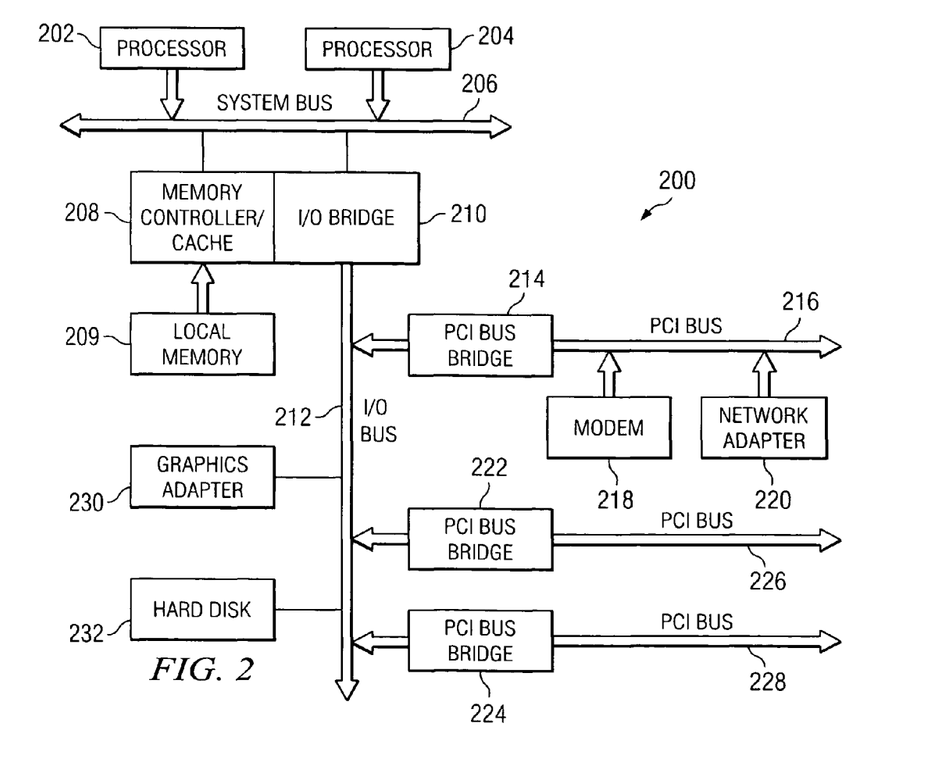
FIG. 2 is an exemplary block diagram of a server computing device in which exemplary aspects of an illustrative embodiment may be implemented.
Figure 3:
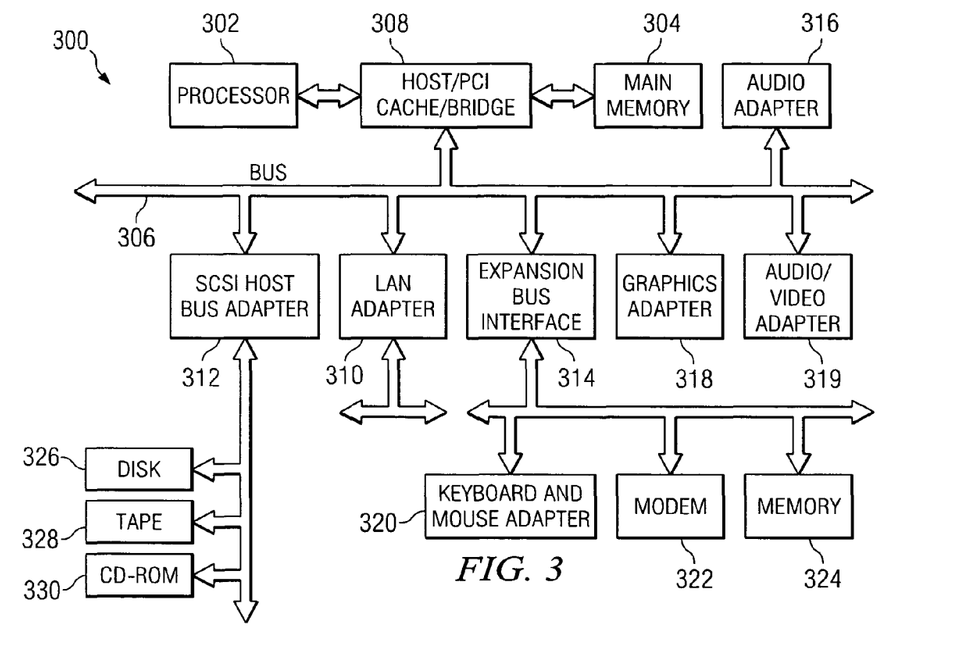
FIG. 3 is an exemplary block diagram of a client computing device in which exemplary aspects of an illustrative embodiment may be implemented.

FIGS. 1-3 provide examples of data processing environments in which aspects of the illustrative embodiments may be implemented. The depicted data processing environments are only exemplary and are not intended to state or imply any limitation as to the types or configurations of data processing environments in which the exemplary aspects of the illustrative embodiments may be implemented. Many modifications may be made to the data processing environments depicted in FIGS. 1-3 without departing from the spirit and scope of the present invention.

With reference now to the figures, FIG. 1 depicts a pictorial representation of a network of data processing systems 100 in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or application servers. In the depicted example, server 104 stores, tracks, and retrieves data objects for clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Referring again to FIG. 1, with the mechanism of the illustrative embodiments, the server 104 may be provided with server backup software for backing up files/data, hereafter referred to collectively as data objects, from client computing devices 108-112, for example. The server 104 may backup the data objects to the network attached storage system 106, for example, or to a storage system (not shown) directly attached to, or otherwise associated with, server 104. Alternatively, network attached storage system 106 may be a database or file storage associated with one or more of the client computing devices 108-112, portions of which may be backed-up to a storage system associated with the server 104 in response to backup request from the client computing devices 108-112.

The client computing devices 108-112 are preferably provided with client backup software that runs on the client computing devices 108-112 and is used to backup data objects from storage devices associated with the client computing devices 108-112 and/or data objects from a network attached storage system 106 associated with the client computing devices 108-112. These backups may include full backups and incremental backups, as is generally known in the art.

In a preferred embodiment, the server 104 runs the Tivoli Storage Manager™ application available from International Business Machines, Inc. of Armonk, N.Y. As is generally known in the art, TSM allows backup-archive clients to backup and restore files and directories at a server, such as server 104. The backup-archive client, e.g., clients 108-112, may copy files, subdirectories, and directories to media controlled by the server 104. Backups can be controlled by administrator-defined policies and schedules, or users can request backups of their own data. The backup policy in the backup copy group indicates how many backup versions the server 104 keeps of data objects and directories, and how long the server 104 keeps inactive backup versions of data objects and directories before expiring these versions. The most recent backup version of a data object, referred to as the active version, is not eligible for expiration. Only inactive backup versions can be expired.

The illustrative embodiments provide mechanisms for improving upon the operation of a backup application by permitting the generation of backup sets for a specific point in time from backup data stored in a backup storage device. Thus, for example, the mechanisms of the illustrative embodiments may be used to enhance the functionality of the Tivoli Storage Manager™ running on server 104. Alternatively, in another illustrative embodiment, the mechanisms of the illustrative embodiments may be used to enhance the generation of backup sets completely within a single computing device, such a client computing device 108, for example. In such an embodiment, the operations attributed to the server, as set forth hereafter, may be performed in the single computing device along with the operations attributed to the client computing device. In this way, a client computing device may make its own backup sets of its own data objects on locally accessible removable storage media. For purposes of the following description, however, it will be assumed that the backup sets are generated by a server computing device, such as server 104, which is in communication with one or more client computing devices 108-112 via one or more networks 102.

The mechanisms of the illustrative embodiments extend the backup set concept from being a copy of the most recently backed-up version of a computer's files or data to being a copy of a computer's files or data for which there were active backups at a particular point in time. In other words, a backup set, in accordance with the illustrative embodiments, becomes a collection of the files and data that would have been the most recently backed-up version of a computer's files and data at the particular point in time if the backup set had been created at that point in time.

Figure 4:
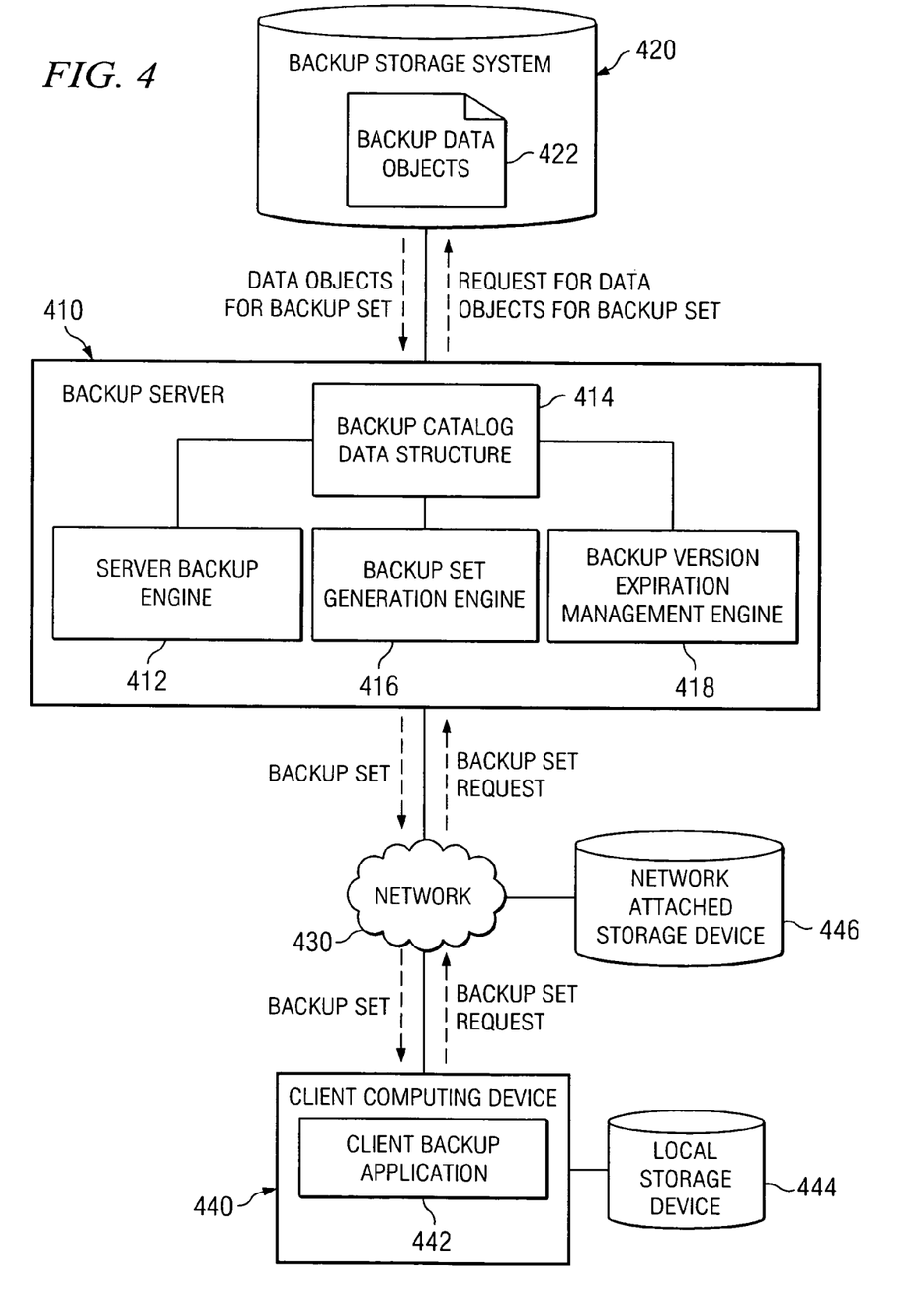
FIG. 4 is an exemplary block diagram illustrating the primary operational components of a backup set generation system in accordance with an illustrative embodiment.

FIG. 4 is an exemplary block diagram illustrating the primary operational components of a backup set generation system in accordance with an illustrative embodiment. As shown in FIG. 4, the backup set generation system includes a backup server 410 and a backup storage system 420. In the depicted example, the backup storage system 420 is directly attached to the backup server 410, however the illustrative embodiments are not limited to such an arrangement. To the contrary, the backup storage system 420 may be associated with the backup server 410 via at least one network 430. For example, the backup storage system 420 may be provided in network attached storage system 446.

The backup server 410 is in communication with a client computing device 440 via the network(s) 430. The client computing device 440 may store data objects on a local storage device 444 and periodically may backup the data objects to the backup server 410 via the client backup application 442 running on the client computing device 440. Alternatively, the data objects may be stored remotely on a network attached storage system, such as network attached storage system 446.

The operations for backing-up data objects from a client computing device to a backup server are generally known in the art and thus, a more detailed explanation is not provided herein. The illustrative embodiments are instead, directed to the generation of backup sets from backed-up data objects. For purposes of the present description, it will be assumed that the data objects have already been backed-up to the backup server 410 in accordance with any currently known or later developed backup methodology. The illustrative embodiments are not limited to any particular manner in which the data objects are backed-up.

In a preferred embodiment, the client computing device 440 runs the client backup application 442 which communicates data objects to the server backup engine 412 running on the backup server 410. The server backup engine 412 performs the necessary operations for backing-up the specified data objects identified by the client backup application 442 to the backup storage system 420.

During the process of backing-up the data objects, a backup catalog data structure 414 is generated and/or updated for the client computing device 440. The backup catalog data structure 414 stores information describing the versions of data objects currently being maintained in the backup storage system 420. Essentially, the backup catalog data structure 414 is a meta-data data structure that may store information including, among other meta-data, the timestamp for when a particular version of a data object was backed-up to the backup storage system 420. In addition, the information for a particular version of a data object may designate a timestamp for when that particular version of the data object was replaced by a newer version or was deactivated because the data object was no longer available to the client computing device 440.

Determining when a version of a data object was replaced by a newer version may be performed when a backup of data objects includes a data object having a same identifier as a data object currently stored on the backup storage system 420. The determination of when a version of a data object is deactivated may be performed, for example, during an incremental backup. When performing an incremental backup, the client computing device 400 queries the backup server 410 for information about the active versions of files already backed-up. Based on this information, the client computing device 440 may determine if a given file on the client computing device 440 has changed or been deleted since the last backup. For a changed file, the client computing device 440 will send the new version to the backup server 410. For a deleted file, the client computing device 440 will inform the backup server to deactivate the active version of the file.

Thus, for each data object present in the backup data objects 422, an entry may be provided in the backup catalog data structure 414 describing the backup characteristics for that version of the backed-up data object. This information may be used with the backup set generation engine 416 and backup version expiration management engine 418 of the backup server 410 to determine which versions of backed-up data objects to include in backup sets for particular points in time and to determine which versions to maintain or delete in the backup storage system 420.

When a user, system administrator, or the like, wishes to generate a backup set of backed-up data objects stored in the backup storage system 420, the user may enter commands into the client computing device 440 instructing the client backup application 442 to request a backup set for a particular point in time. The user may designate a point in time that is the current time or a point in time in the past. The user may further designate what types of data objects to include in the backup set. For example, in the case of a system administrator, the administrator may designate for what client computing devices, application server computing devices, or the like, the backup set is to be generated. Moreover, the user may designate what directories, sub-directories, or other portions of data objects are to be included in the backup set. Alternatively, rather than having a user enter this information into the client computing device 440, the backup server 410 or client backup application 442 may have a scheduling mechanism for scheduling backup set generation operations for generating backup sets for particular points in time in the past.

The parameters provided to the client backup application 442 for the generation of a backup set are used to create a backup set generation request that is transmitted, via the at least one network 430, to the backup server 410. The backup server 410 receives the backup set generation request from the client computing device 440 and provides the backup set generation request to the backup set generation engine 416. Alternatively, the backup set generation request can be scheduled on the server backup engine 412 and executed without human intervention. Preferably, the backup set generation request designates, among other parameters, a point in time for which the backup set is to be generated. Other parameters of the backup set generation request may further designate the types of data objects that are to be included in the backup set. However, for purposes of this explanation, it will be assumed that all data objects associated with the client computing device 440 and meeting the specified point-in-time criterion are to be included in the backup set. As a result, it is not necessary, in this exemplary implementation, to filter the data objects to be included in the backup set based on the designation in the parameters of the backup set generation request.

The designation of a particular point in time in the backup set generation request may designate a current time, in which case the backup set would be generated using the most recent version of the backup data objects for the client computing device(s), or a time in the past, such as the day before the current time, the week before the current time, the month before the current time, or the like. Regardless of whether the current time or a time in the past is designated, the mechanisms of the illustrative embodiments operate to determine what versions of data objects were the most recently backed-up version of the data objects at the particular point in time designated in the backup set generation request.

Based on the designation of the particular point in time in the backup set generation request received from the client computing device 440, and other parameters designating what data objects are to be included in the backup set, if any, the backup set generation engine 416 searches the backup catalog data structure 414 to identify which data objects to include in a backup set for the specified point in time. Creating a backup set with the most recently backed-up versions of a computer's data objects at a particular point in time requires that the mechanism of the illustrative embodiment know when a particular backup version of a data object was backed-up and when a particular backup version of a data object was replaced by a newer version or was deactivated because the data object is no longer stored on the client computer. This information may be retrieved from the backup catalog data structure 414. In addition, an operational requirement is that the backup storage system 420 maintain all backup versions of all data objects for as long as might be necessary for inclusion in a backup set.

Knowing when a data object was backed-up is one part of the methodology implemented by the backup set generation engine 416 for selecting the backup versions of data objects to be included in a backup set. This leads to a first backup set generation rule implemented by the backup set generation engine 416 that states that, for a given point in time, any data object backed-up after the specified point in time is too new to be considered for inclusion in the backup set. In other words, only data objects backed-up on, or prior to, the specified point in time may be included in the backup set. By applying this rule to the backup versions, a first set of candidate versions of data objects for inclusion in a backup set may be identified.

In other words, the backup set generation engine 416 may retrieve the meta-data for the backup data objects 422 for the client computing device 440 from the backup catalog data structure 414. Based on this meta-data, the backup set generation engine 416 searches the retrieved entries from the backup catalog data structure 414 for those entries having a backup timestamp that is equal to or prior to the specified point in time. Those entries meeting this requirement may be temporarily stored as a subset of entries in a first candidate data structure.

The backup time of a version of a data object could be used as a sole indicator for deciding whether it should be placed in the backup set or not. However, the backup time alone is not the best indicator of whether or not the version of the data object should be included in the backup set because this would require that the backup set generation engine 416 compare the backup times of every version of the data object to determine which one is the most recent time that is less than or equal to the specified point in time. Such comparisons take increasingly more time as the number of versions maintained in the backup storage system 420 increases. Furthermore, this approach may produce incorrect results if the most recent version backed-up prior to the specified point in time has been deleted from the backup storage system 420. In this case, an earlier version could be included in the backup set even though that version had been replaced on the client computing device 440 at the specified point in time. Additionally, incorrect results could be achieved if the most recent version backed-up prior to the specified point in time was deactivated because the data object had been deleted from the client computer 440. In such a case, the most recent version could incorrectly be added to the backup set even though, at the specified time, no version of the data object was available to the client computing device.

Thus, a second consideration of the backup set generation engine 416 when determining what versions of data objects to include in a backup set for a specified point in time includes determining when the backup version was deactivated. Knowing when a backup version of a data object was replaced by a newer version allows the backup set generation engine 416 to make the decision to include a given version of a data object in the backup set without knowing anything about any other versions.

If the most recently backed-up version is referred to as the "active" version, and all previous versions are referred to as "inactive" versions, then the time at which an active version is replaced by a newer version becomes the time of its deactivation, or its "deactivation time." Similarly, if an active data object is no longer stored on the client machine, the active data object is deactivated during the next backup, as discussed above. Data objects that have not yet been deactivated are considered to have a deactivation time infinitely far in the future.

Using the deactivation time, a second backup set generation rule implemented by the backup set generation engine 416 states that for a given point in time, any version of a data object that was deactivated on or before the specified point in time is too old to be considered. In other words, only active data objects or data objects deactivated after the specified point in time may be included in the backup set.

By applying this second backup set generation rule to the first set of candidate versions of data objects, the particular versions of the data objects that were present on the client computing device 440 at the specified time but were not deactivated until after the specified point in time are identified. As a result, the most recent version of the data objects present on the client computing device 440 at the specified point in time may be identified as a second set of candidate versions of data objects.

In an alternative illustrative embodiment of the present invention, rather than having two separate and distinct steps for generating a first candidate set and a second candidate set of versions of data objects for inclusion in a backup set, a single step may be utilized to identify which versions of data objects are to be included in the backup set. That is, information for each data object may be checked to determine whether the object was backed up on or before the specified point in time and whether the deactivation time is greater than the specified point in time, in a single step. If both of these conditions are satisfied, then the data object can be included in the backup set. This process may be repeated in a loop for each object.

This alternative illustrative embodiment may be more efficient in some implementations in that processor cycles and storage space may be saved. Of course either implementation, or even modifications of these implementations, may be used without departing from the spirit and scope of the present invention.

Regardless of the particular implementation chosen, the identified versions of the data objects may then be aggregated, by the backup set generation engine 416, into a backup set for the specified point in time and provided to the requestor of the backup set. Typically, the backup set will be stored on one or more removable media (not shown) that are shipped to the requester. For example, a magnetic tape drive, optical storage drive, or other known mass storage drive (not shown) may be provided in association with the backup server 410 and may be used to write the backup set to the removable media. Alternatively, if the size of the backup set is not too large, it may be feasible to transmit the backup set to the client computing device 440 via the at least one network 430.

In addition to the above, in order to permit the generation of backup sets for points in time in the past, all backup versions for data objects for a time period at which an oldest backup set is expected to be requested, are maintained in the backup storage system 420. There are practical trade-offs involved in storing multiple backup versions for data objects. As more versions of data objects are permitted to be stored in the backup storage system 420, the backup storage system 420 will require more storage space just for backup purposes. Keeping an unlimited number of versions of data objects is generally not feasible. One must choose between the amount of time the backup server 410 must be able to go back to when generating backup sets, and the amount of storage space available to hold backup versions of data objects.

The mechanisms of the illustrative embodiments provide tunable parameters that a user may set, via the client backup application 442, for example, for designating the tradeoff between storage space and backup set time period. In the illustrative embodiments, a user may set a retention time parameter and a number of versions limit parameter. The retention time parameter specifies how long to retain versions of data objects after deactivation. The number of versions limit parameter specifies the maximum number of backup versions of data objects to retain in the backup storage system.

In the illustrative embodiments, the backup version expiration management engine 418 is provided that periodically scans information about the backup versions of data objects maintained in the backup storage system 420, i.e. the metadata in the backup catalog data structure 414, to determine whether to delete or maintain the versions of data objects in the backup storage system 420. The backup version expiration management engine 418 applies two rules to the versions of data objects maintained in the backup storage system. First, any inactive versions of data objects having a backup timestamp that is older than the retention time parameter, may be deleted from the backup storage system 420. Second, if the number of versions of a data object exceeds the number of backup versions parameter, then the oldest backup versions of the data object may be deleted until the number of versions of a data object is less than or equal to this limit parameter. In this way, the amount of storage space utilized for backup versions may be kept to a minimum for a particular sliding window during which point-in-time backup sets may be generated using the mechanism of the illustrative embodiment.

By applying the point in time concept to backup sets, a system administrator is provided with the ability to create a backup set for any particular point in time up to a time limit corresponding to an oldest inactive backup. Thus, the system administrator may wait until tomorrow to create yesterday's backup set. As a result, the system administrator is given the ability to respond to new, unanticipated demands for backup data after the window for satisfying the demands would have otherwise closed and the peace of mind of knowing that an operational problem, such as a tape drive failure, no longer means that the month-end backup set on which his or her business' survival depends cannot be created.

In addition, creating a backup set to a particular point in time also resolves inconsistency problems. By only copying data objects that were active at a particular point in time, it no longer matters if one backup version has been replaced by a newer one. The correct version of the backup will be copied into the backup set, regardless of the number of times it has been replaced with newer backup versions. If data objects no longer existed on the client machine at the specified point in time, these will not be copied to the backup set. Generation of a backup set thus, becomes an atomic operation that correctly and consistently reflects backup data that existed at the specified point in time.

It should be noted that while the above illustrative embodiments have been described in terms of a backup server based system, as mentioned previously, the present invention is not limited to such. To the contrary, the above operations attributed to the backup server may also be performed entirely within the client computing device 440 without departing from the spirit and scope of the present invention. In such an embodiment, for example, the client backup application 442 may be provided with a backup engine, a backup set generation engine, a backup catalog data structure, and/or a backup version expiration management engine for backing up data objects to a backup storage system local to the client computing device 440 and for generating backup sets based on such backed-up data objects. Thus, the mechanism of the illustrative embodiments may be implemented completely within a single computing device rather than a distributed data processing system such as the one shown in FIG. 4.

Figure 5:
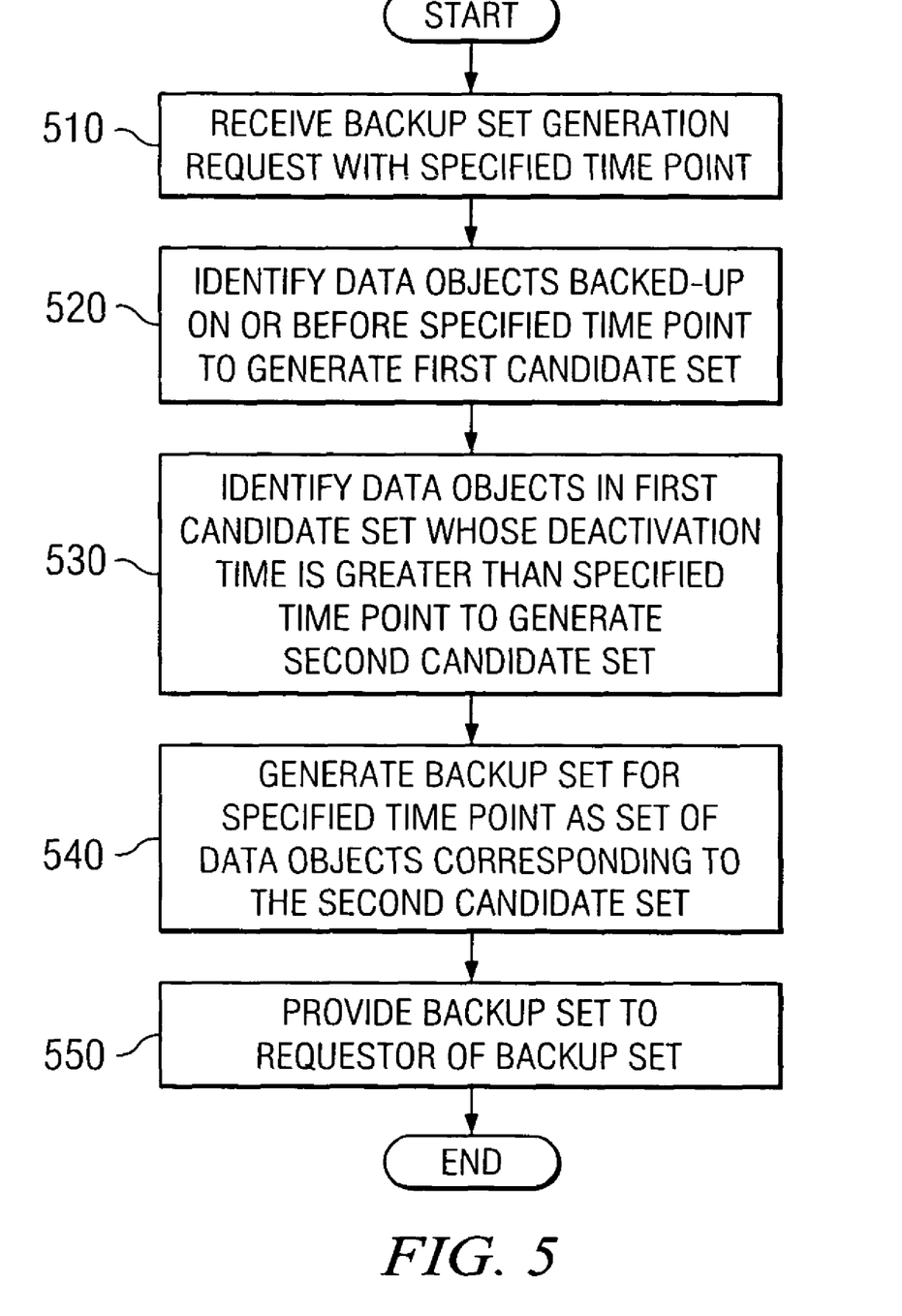
FIG. 5 is a flowchart outlining an exemplary operation for generating a backup set in accordance with one illustrative embodiment.
Figure 6:
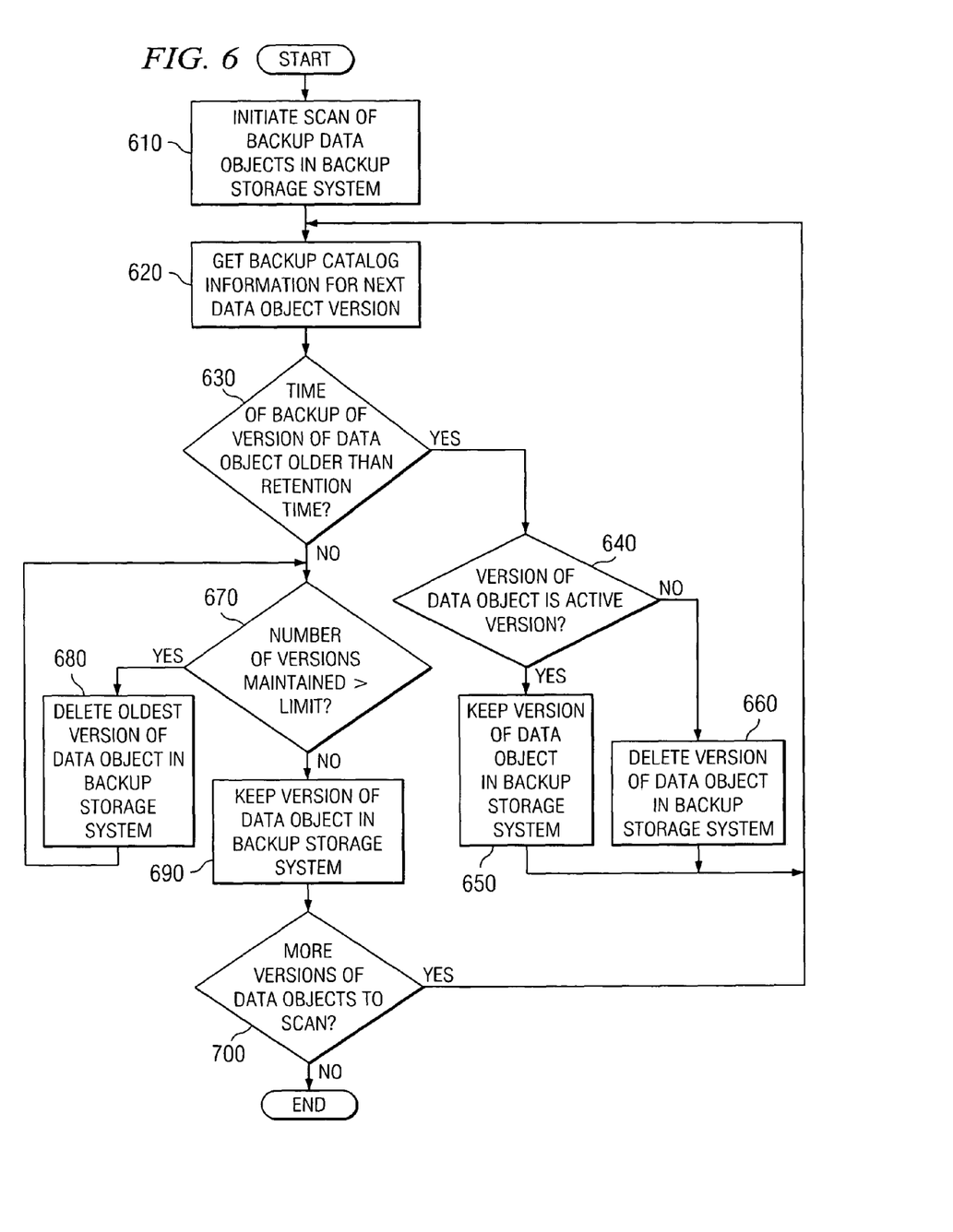
FIG. 6 is a flowchart outlining an exemplary operation for identifying expired backups for removal in accordance with one illustrative embodiment.

FIGS. 5 and 6 outline exemplary operations of an illustrative embodiment of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 5 is a flowchart outlining an exemplary operation for generating a backup set in accordance with one illustrative embodiment. As shown in FIG. 5, the operation starts with the receipt of a backup set generation request with a specified point in time for which a backup set is to be generated (step 510). Backed-up data objects in a backup storage system are identified that have backup timestamps on or before the specified point in time to thereby generate a first candidate set of versions of backed-up data objects (step 520). Versions of data objects in the first candidate set whose deactivation time is greater than the specified point in time are identified to thereby generate a second candidate set of versions of data objects for inclusion in the backup set (step 530).

It should be noted that, in an alternative illustrative embodiment of the present invention, rather than having two separate and distinct steps for generating a first candidate set and a second candidate set of versions of data objects for inclusion in a backup set, a single step may be utilized to identify which versions of data objects are to be included in the backup set. That is, as described previously, information for each data object may be checked to determine whether the object was backed up on or before the specified point in time and whether the deactivation time is greater than the specified point in time, in a single step. If both of these conditions are satisfied, then the data object can be included in the backup set. This process may be repeated in a loop for each object.

It should further be noted that, in some illustrative embodiments of the present invention, an additional step may be performed prior to steps 520 and 530 that identifies the objects that are associated with a particular computing device and object type specified in the backup set generation request. Information regarding the objects of the particular type that are associated with the specified computing device may be retrieved and used as a basis for performing the remaining steps set forth in FIG. 5.

Once the versions of data objects for inclusion in the backup set are identified, the backup set is generated for the specified point in time as a set of versions of data objects corresponding to the second candidate set (step 540). The backup set is then provided to the requester of the backup set (step 550). As described above, this may include writing the identified versions of data objects to a removable media for shipping to the requester, for example. The operation then ends.

FIG. 6 is a flowchart outlining an exemplary operation for identifying expired backups for removal in accordance with one illustrative embodiment. As shown in FIG. 6, the operation starts by initiating a scan of the backup versions of data objects in the backup storage system (step 610). Backup catalog information for a next version of a data object is obtained (step 620) and a determination is made as to whether the time of backup of the version of the data object is older than the retention time (step 630). If so, a determination is made as to whether the version of the data object is an active version (step 640). If so, the version of the data object is maintained in the backup storage system (step 650). If the version of the data object is not an active version, the version is deleted from the backup storage system (step 660).

If the time of backup of the version of the data object is not older than the retention time (step 630), then a determination is made as to whether a number of versions maintained for the data object is greater than a versions limit parameter (step 670). If so, then the oldest version of the data object is deleted from the backup storage system (step 680) and the operation returns to step 670. If the number of versions of the data object maintained in the backup storage system is not greater than the inactive versions limit, then the version of the data object is maintained in the backup storage system (step 690).

A determination is then made as to whether there are more versions of data objects to be scanned (step 700). If so, the operation returns to step 620 where backup catalog information for the next data object is retrieved. If there are no more versions of data objects to be scanned, the operation terminates.

Thus, the illustrative embodiments provide a mechanism for selecting versions of data objects to be included in a backup set for a particular specified point in time. In this way, backup sets may be generated for any particular point in time up to a limit determined by the retention time and number of allowed versions. Therefore, greater flexibility is provided in obtaining backup sets for various purposes in which the most recent version of data objects is not necessarily the backup set that is desired. The illustrative embodiments provide a mechanism for the most recent version of data objects for a particular point in time to be identified and provided in a backup set to a requester.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method, in a data processing system, for generating a backup set, comprising:

receiving a request for generation of a backup set from two or more existing backups, wherein the request includes a point in time for which the backup set is to be generated, wherein the point in time is a point in time prior to a current time, and wherein using the point in time that is prior to the current time causes the backup set that is to be generated from the two or more existing backups to be a collection of data objects from the two or more existing backups that would have been the most recently backed-up version of the data processing system's data objects at the point in time that is prior to the current time as though the backup set had been created at the point in time that is prior to the current time;

identifying versions of the data objects in the two or more existing backups in a backup storage system that would have been a most recently backed-up version of the data objects at the point in time that is prior to the current time as though the backup set had been created at that point in time that is prior to the current time, wherein identifying the versions of the data objects in the two or more existing backups in the backup storage system comprises:

identifying a first candidate set of the versions of the data objects in the two or more existing backups in the backup storage system that have backup timestamps equal to or prior to the point in time, wherein identifying the first candidate set of versions of the data objects, further comprises:

retrieving backup catalog information for the versions of the data objects from the two or more existing backups; and searching entries in the backup catalog information to identify entries having a backup timestamp that is equal to or prior to the point in time; and identifying a second candidate set of the versions of the data objects in the first candidate set that have deactivation times on or before the point in time, wherein identifying the second candidate set of versions of the data objects in the first candidate set, further comprises:

searching the entries in the first candidate set of the backup catalog information to identify entries having a deactivation time that is on or before the point in time;

storing the versions of data objects that are identified in the first candidate set as active and are not identified in the second candidate set as being deactivated on or before the point in time as the backup set for the point in time that is prior to the current time;

searching the versions of the data objects in the two or more existing backups in the backup storage system to identify data objects having a backup timestamp that is older than a retention time parameter;

determining, for each version of a data object, in the versions of the data objects in the two or more existing backups, having a backup timestamp older than the retention time parameter, whether the version is an active version of the data object; and deleting the version of the data object from the two or more existing backups in response to the version of the data object is not an active version of the data object.

2. The method of claim 1, wherein identifying the versions of the data objects in the two or more existing backups in the backup storage system is performed in a single operation that is executed on each data object from the two or more existing backups in the backup storage system meeting criteria set forth in the request for generation of the backup set.

3. The method of claim 1, wherein the data object is an electronic file.

4. The method of claim 1, further comprising:
searching the versions of the data objects in the two or more existing backups to identify data objects for which a number of versions maintained in the two or more existing backups in the backup storage system is greater than a version limit; and deleting an oldest version of the versions of data objects from the two or more existing backups that have a number of versions maintained in the two or more existing backups in the backup storage system that is greater than the version limit.

5. The method of claim 1, wherein the request for generation of a backup set from the two or more existing backups includes at least one parameter designating a type of data object from the two or more existing backups to include in the backup set, and further comprising:
identifying versions of data objects in the two or more existing backups in a backup storage system by filtering data objects to be included in the backup set based on the at least one parameter.

6. The method of claim 5, wherein the at least one parameter designating the type of data object from the two or more existing backups to include in the backup set designates at least one of an identifier of one or more client computing devices for which the backup set is to be generated, an identifier of one or more server computing devices for which the backup set is to be generated, or an identifier of one or more directories and sub-directories to include in the backup set.

7. A computer program product comprising a non-transitory computer readable storage medium having a computer readable program stored therein, wherein the computer readable program, when executed on a computing device, causes the computing device to:
receive a request for generation of a backup set from two or more existing backups, wherein the request includes a point in time for which the backup set is to be generated, wherein the point in time is a point in time prior to a current time, and wherein using the point in time that is prior to the current time causes the backup set that is to be generated from the two or more existing backups to be a collection of data objects from the two or more existing backups that would have been the most recently backed-up version of the data processing system's data objects at the point in time that is prior to the current time as though the backup set had been created at the point in time that is prior to the current time;

identify versions of the data objects in the two or more existing backups in a backup storage system that would have been a most recently backed-up version of the data objects at the point in time that is prior to the current time as though the backup set had been created at that point in time that is prior to the current time, wherein the computer readable program causes the computing device to identify the versions of the data objects in the two or more existing backups in the backup storage system by:
identifying a first candidate set of the versions of the data objects in the two or more existing backups in the backup storage system that have backup timestamps equal to or prior to the point in time, wherein identifying the first candidate set of versions of the data objects, further comprises:
retrieving backup catalog information for the versions of the data objects from the two or more existing backups; and
searching entries in the backup catalog information to identify entries having a backup timestamp that is equal to or prior to the point in time; and
identifying a second candidate set of the versions of the data objects in the first candidate set that have deactivation times on or before the point in time, wherein identifying the second candidate set of versions of the data objects in the first candidate set, further comprises:
searching the entries in the first candidate set of the backup catalog information to identify entries having a deactivation time that is on or before the point in time;
store the versions of data objects that are identified in the first candidate set as active and are not identified in the second candidate set as being deactivated on or before the point in time as the backup set for the point in time that is prior to the current time;
searching the versions of the data objects in the two or more existing backups in the backup storage system to identify data objects having a backup timestamp that is older than a retention time parameter;
determining, for each version of a data object, in the versions of the data objects in the two or more existing backups, having a backup timestamp older than the retention time parameter, whether the version is an active version of the data object; and
deleting the version of the data object from the two or more existing backups in response to the version of the data object is not an active version of the data object.

8. The computer program product of claim 7, wherein the computer readable program causes the computing device to identify the versions of the data objects in the two or more existing backups in the backup storage system in a single operation that is executed on each data object from the two or more existing backups in the backup storage system meeting criteria set forth in the request for generation of the backup set.

9. A system, comprising:
a processor;
a memory coupled to the processor; and
a storage device coupled to the processor, wherein the memory stores instructions which, when executed by the processor, cause the processor to:
receive a request for generation of a backup set from two or more existing backups, wherein the request includes a point in time for which the backup set is to be generated, wherein the point in time is a point in time prior to a current time, and wherein using the point in time that is prior to the current time causes the backup set that is to be generated from the two or more existing backups to be a collection of data objects from the two or more existing backups that would have been the most recently backed-up version of the data processing system's data objects at the point in time that is prior to the current time as though the backup set had been created at the point in time that is prior to the current time;

identify versions of the data objects in the two or more existing backups in a backup storage system that would have been a most recently backed-up version of the data objects at the point in time that is prior to the current time as though the backup set had been created at that point in time that is prior to the current time, wherein the instructions cause the processor to identify the versions of the data objects in the two or more existing backups in the backup storage system comprises:

identifying a first candidate set of the versions of the data objects in the two or more existing backups in the backup storage system that have backup timestamps equal to or prior to the point in time, wherein identifying the first candidate set of versions of the data objects, further comprises:

retrieving backup catalog information for the versions of the data objects from the two or more existing backups; and         searching entries in the backup catalog information to identify entries having a backup timestamp that is equal to or prior to the point in time; and     identifying a second candidate set of the versions of the data objects in the first candidate set that have deactivation times on or before the point in time, wherein identifying the second candidate set of versions of the data objects in the first candidate set, further comprises:

searching the entries in the first candidate set of the backup catalog information to identify entries having a deactivation time that is on or before the point in time;

store the versions of data objects that are identified in the first candidate set as active and are not identified in the second candidate set as being deactivated on or before the point in time as the backup set for the point in time that is prior to the current time;

searching the versions of the data objects in the two or more existing backups in the backup storage system to identify data objects having a backup timestamp that is older than a retention time parameter;

determining, for each version of a data object, in the versions of the data objects in the two or more existing backups, having a backup timestamp older than the retention time parameter, whether the version is an active version of the data object; and deleting the version of the data object from the two or more existing backups in response to the version of the data object is not an active version of the data object.

10. The system of claim 9, wherein the instructions cause the processor to identify the versions of the data objects in the two or more existing backups in the backup storage system in a single operation that is executed on each data object from the two or more existing backups in the backup storage system meeting criteria set forth in the request for generation of the backup set.

* * * * *